United States Patent
Chou et al.

(10) Patent No.: US 9,606,794 B1
(45) Date of Patent: *Mar. 28, 2017

(54) GENERATING AND MANAGING APPLICATIONS USING ANY NUMBER OF DIFFERENT PLATFORMS

(71) Applicant: International Business Machines Corporation, Armonk, NY (US)

(72) Inventors: Wei-Ting Chou, Taipei (TW); Chih-Hsiung Liu, Taipei (TW); Hao-Ting Shih, Taipei (TW); Joey H. Y. Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,929

(22) Filed: Dec. 16, 2015

(51) Int. Cl.
| | | |
|---|---|---|
| G06F 7/44 | (2006.01) | |
| G06F 9/44 | (2006.01) | |
| G06F 9/445 | (2006.01) | |
| G06F 3/0484 | (2013.01) | |

(52) U.S. Cl.
CPC ............ *G06F 8/76* (2013.01); *G06F 3/04842* (2013.01); *G06F 8/60* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 8,924,559 B2 | 12/2014 | Brown et al. | |
| 2012/0281706 A1* | 11/2012 | Agarwal | H04L 67/1002 370/395.53 |
| 2013/0060928 A1* | 3/2013 | Shao | G06F 9/5072 709/223 |
| 2013/0066940 A1* | 3/2013 | Shao | H04L 67/1025 709/201 |

(Continued)

FOREIGN PATENT DOCUMENTS

| | | |
|---|---|---|
| WO | 2014007811 A1 | 1/2014 |
| WO | 2014021849 A1 | 2/2014 |

OTHER PUBLICATIONS

U.S. Appl. No. 15/071,528, filed Mar. 16, 2016; Entitled "Generating and Managing Applications Using Any Number of Different Platforms".

(Continued)

*Primary Examiner* — Philip Wang
(74) *Attorney, Agent, or Firm* — Walter L. Rudberg

(57) ABSTRACT

At least one application is received from a user. The at least one application is stored on a communication platform. A catalog is received. The catalog includes at least one service. Each service of the at least one service is associated with a platform. An indication of a selection, from the user, is received. The selection comprises a first service associated with a first platform, and a second service associated with a second platform. The first service stores the at least one application from the user. The second service runs the at least one application from the user. Responsive to receiving the indication, the at least one application is deployed to the indicated first platform. Additionally, responsive to receiving the indication, a service bridge from the communication platform to the second platform is deployed. The at least one application is run, on the first platform utilizing the service bridge.

20 Claims, 10 Drawing Sheets

(56) References Cited

U.S. PATENT DOCUMENTS

2014/0195663 A1* 7/2014 Hirschenberger .... H04W 4/046
709/223
2014/0280964 A1 9/2014 Farooq et al.
2014/0280966 A1 9/2014 Sapuram et al.
2015/0026349 A1 1/2015 Iyoob
2016/0019636 A1* 1/2016 Adapalli ............ G06Q 30/0641
705/26.62

OTHER PUBLICATIONS

List of IBM Patents or Patent Applications Treated As Related; Dated Mar. 16, 2016; 2 pages.

Mell et al.; "The NIST Definition of Cloud Computing"; NIST Special Publication 800-145; Sep. 2011; 7 pages.

Banafa, Ahmed, "Cloud of Clouds (Intercloud)", Nov. 17, 2014, 6 pages, <https://www.bbvaopenmind.com/en/cloud-clouds-intercloud/>.

Owens, Kenneth, "Cisco Intercloud Provides a Platform for Application Enablement and Innovation", Apr. 10, 2014, 7 pages, <https://blogs.cisco.com/datacenter/cisco-intercloud-provides-a-platform-for-application-enablement-and-innovation>.

* cited by examiner

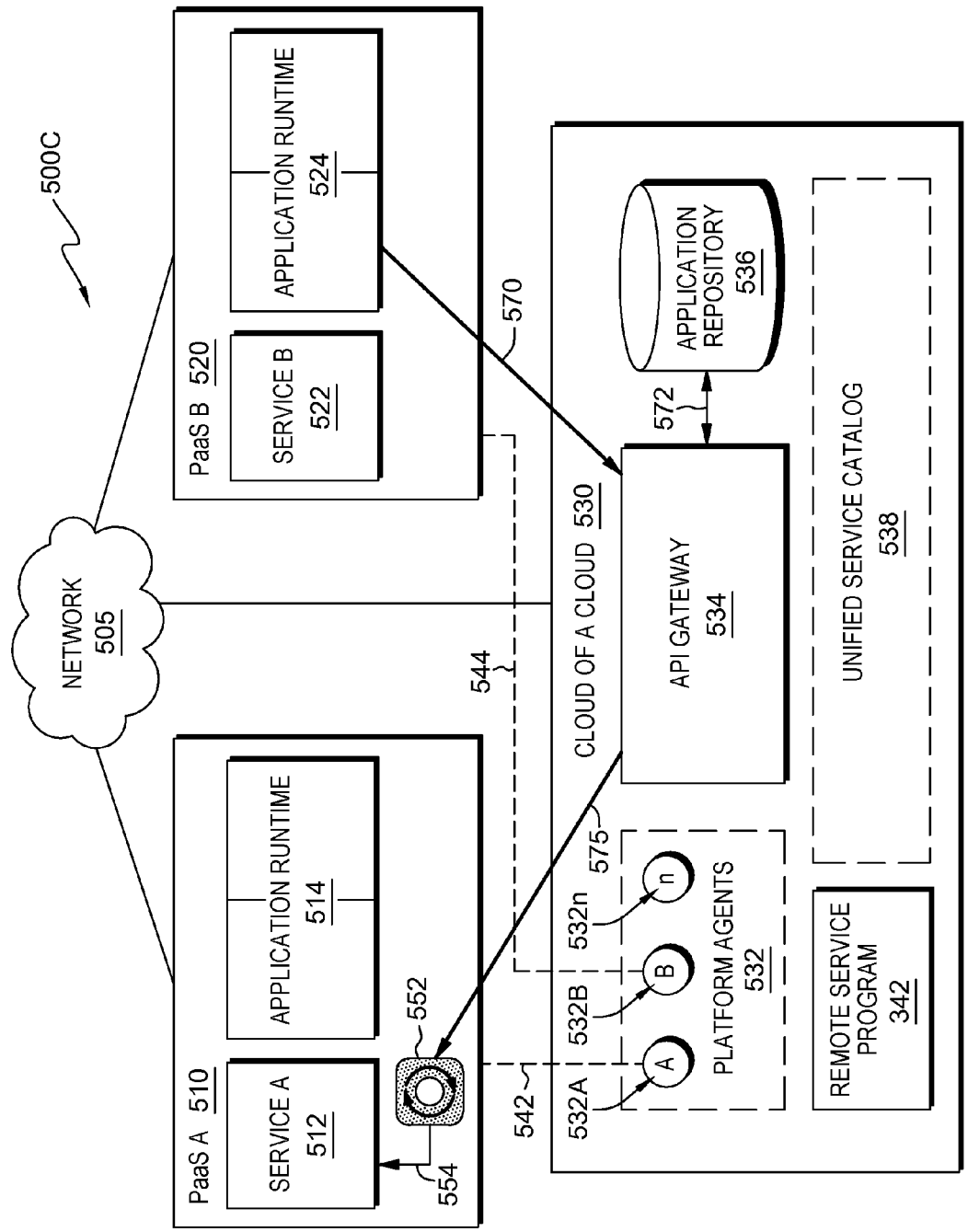

GENERATING AND MANAGING APPLICATIONS USING ANY NUMBER OF DIFFERENT PLATFORMS

BACKGROUND OF THE INVENTION

The present invention relates generally to the field of cloud computing architecture and, more particularly, to methodologies and systems for implementing an enhanced cloud platform able to access a plurality of target platforms.

Cloud computing is the practice of using a network of remote servers hosted on a public network to deliver computing services. Cloud computing may provide numerous services such as retaining databases and leveraging computing power without the need of maintaining a local server. Generally, cloud services are operated by different service providers, where each system is isolated and distinct from another. Cloud computing offered by one provider might not be available by another provider. For example, services on one platform, might not be usable on another platform. This creates an isolated cloud computing environment between providers.

SUMMARY

Embodiments of the present invention include a method, computer program product, and system for method generating and managing applications using any number of different platforms. In one embodiment, at least one application is received from a user. The at least one application is stored on a communication platform. A catalog is received. The catalog includes at least one service. Each service of the at least one service is associated with a platform of a plurality of platforms. An indication of a selection, from the user, is received. The selection comprises a first service of the at least one service associated with a first platform, and a second service of the at least one service associated with a second platform. The first service of the first platform stores the at least one application from the user. The second service of the second platform runs the at least one application from the user. Responsive to receiving the indication, the at least one application is deployed, from the communication platform to the indicated first platform for storage. Additionally, responsive to receiving the indication, a service bridge from the communication platform to the second platform is deployed. The service bridge enables the at least one application from the user to access the second platform. The at least one application is run, on the first platform through the second service of the second platform, utilizing the service bridge.

BRIEF DESCRIPTION OF THE DRAWINGS

FIGS. 5A-C are an illustrative example of a invoking a service on a target platform, in accordance with an embodiment of the present invention;

DETAILED DESCRIPTION

Figure 1:
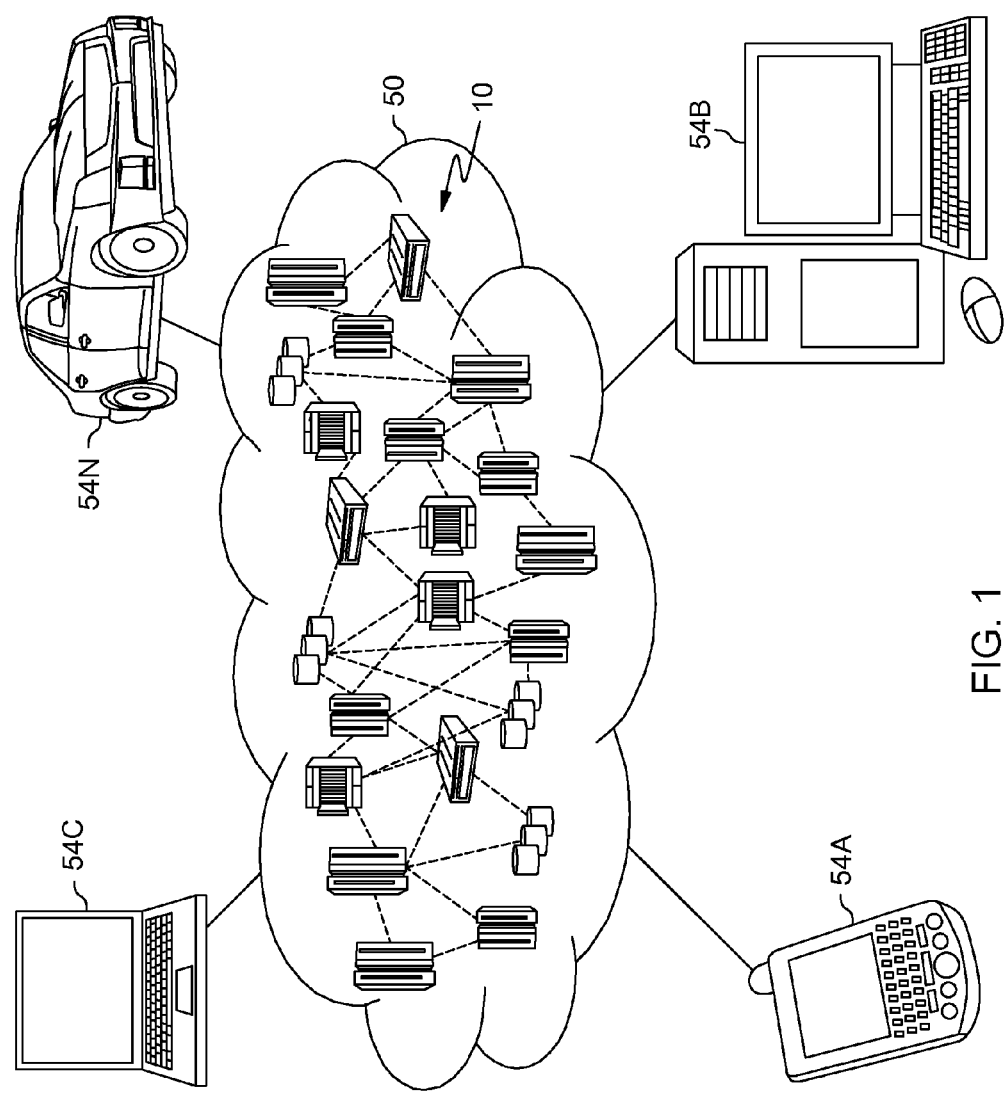
FIG. 1 depicts a cloud computing environment according to an embodiment of the present invention.

Cloud computing is a growing industry as business entities and individuals are moving from maintaining and utilizing their own computing infrastructure to purchasing the right to use various computing needs from a service provider.

Embodiments of the present invention may be utilized in a plurality of environments and functions. Cloud computing services enables organizations to use externally hosted computing resources on which to run their own applications and services. For example, a cloud system and/or application developers may be utilized by: businesses, students, educators, researchers, government agencies, professionals, hospitals and the like.

Embodiments of the present invention provide a higher level cloud platform, referred hereinafter as cloud of a cloud. A cloud platform is a system of hardware and software where applications may run in an environment composed primarily of cloud services. For example, a cloud platform, is created by a service provider, who allows the deployment of software applications by a user (application developer) without the complexity of managing the underlying hardware and software layers. Often cloud platforms, as provided by a service provider, have proprietary software managing the cloud platform.

In an embodiment, cloud of a cloud has access to various platforms and the ability to retrieve service catalogs from the various platforms. A service catalog is an organized collection of information technology related services that may be performed on the designated system. For instance, a service catalog provides a cloud services are available, their function, and know the technologies used to provide the services.

An embodiment of the present invention provides a method to bridge cloud platforms, allowing users to develop an application at an abstract level with the ability to utilize any platform to which the cloud of a cloud has access to. For example, an application developer has the ability to bind their application to the cloud of a cloud service. Therefore, providing the ability for an application developer the ability to choose the runtime and service independently. For example, at runtime, the target service may run on a platform chosen by the developer.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
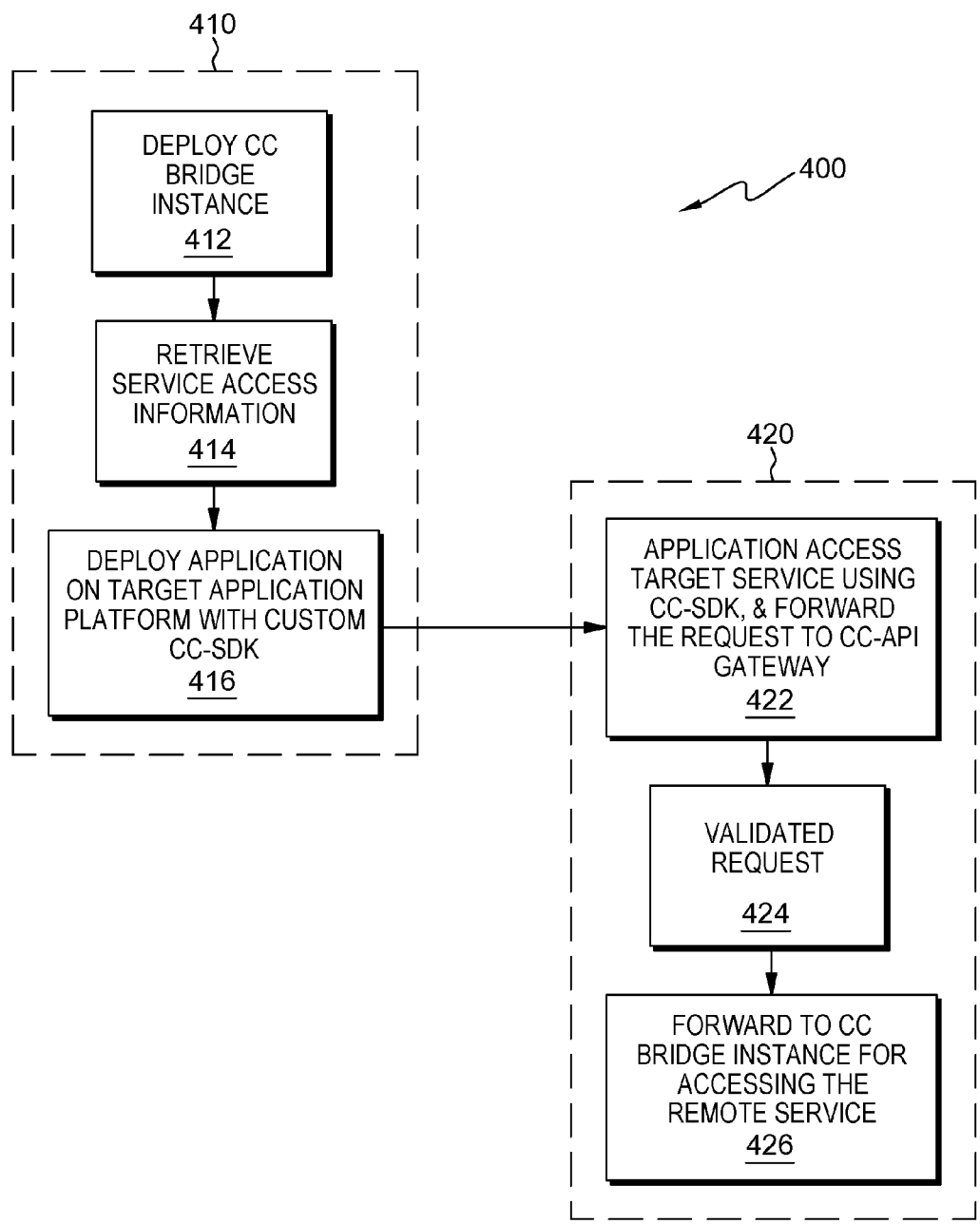
FIG. 4 is a flowchart illustrating operational steps for higher level cloud, in accordance with an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 2:
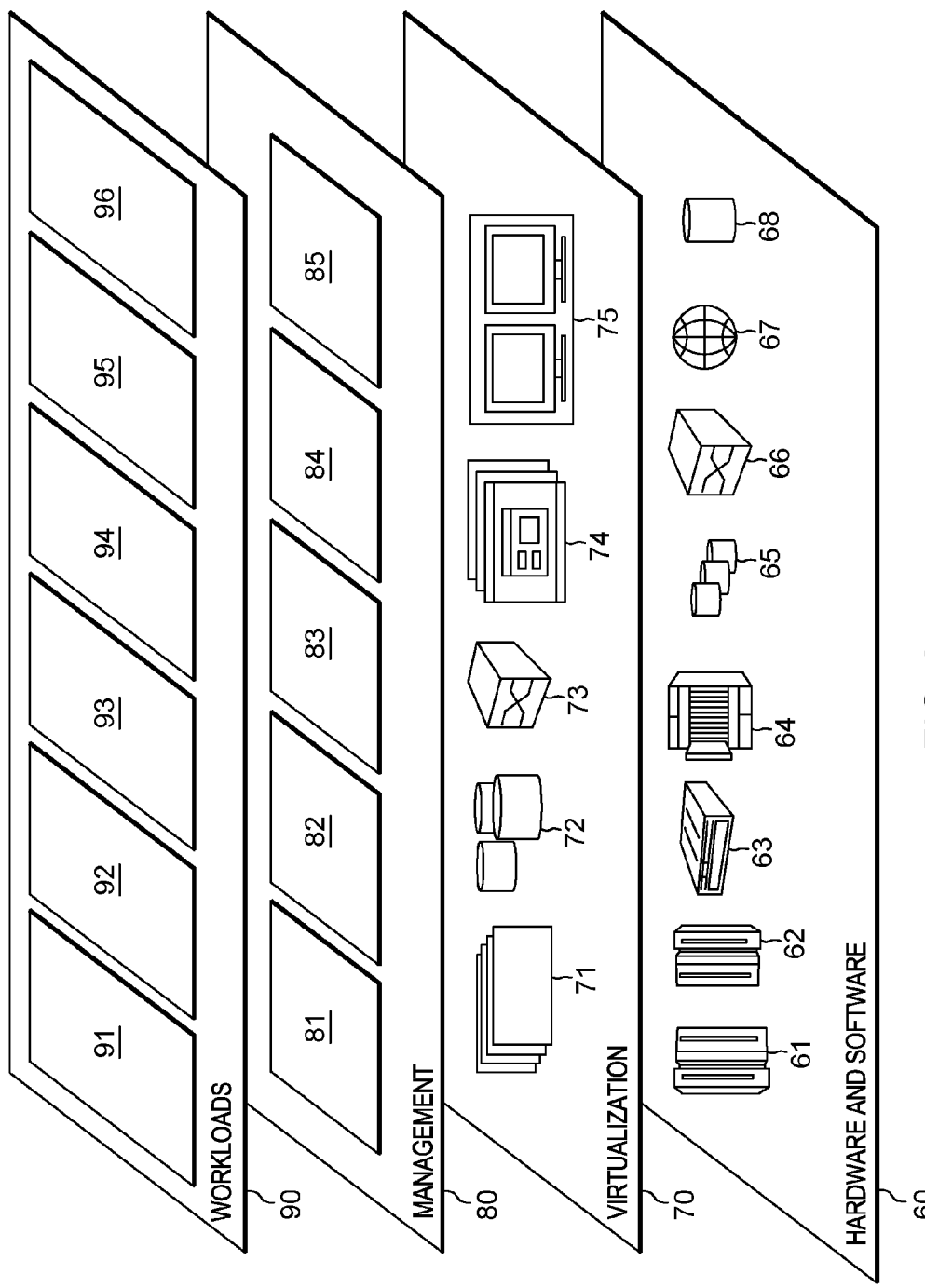
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application processing 96.

Figure 3:
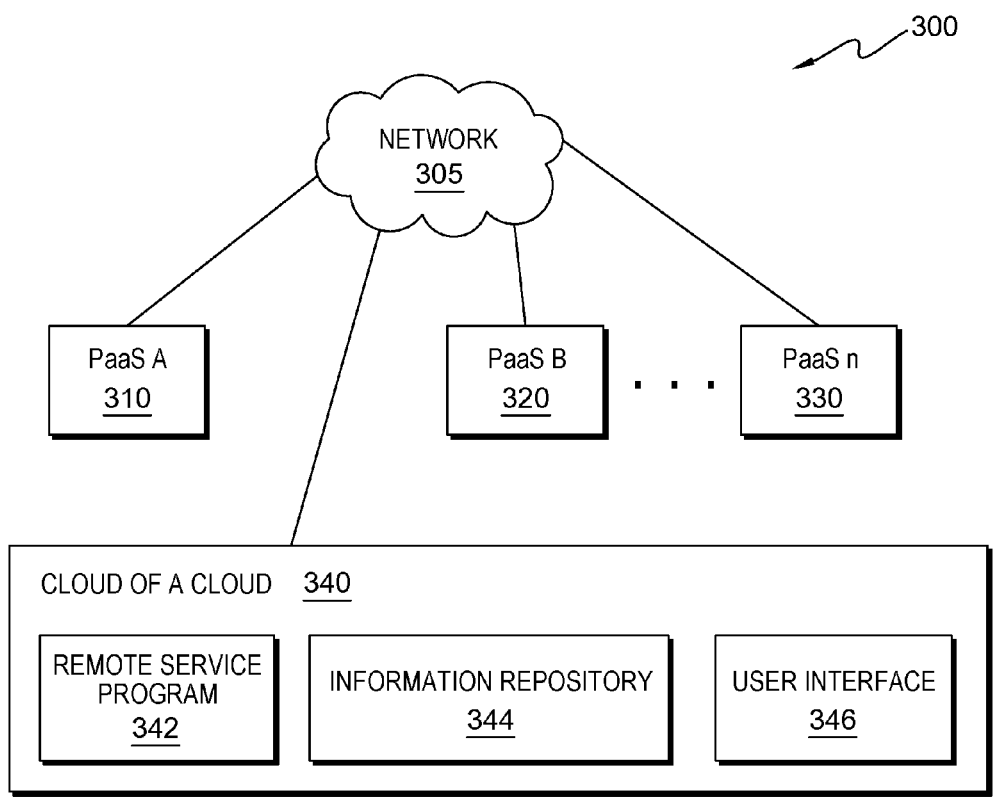
FIG. 3 is a functional block diagram illustrating a data processing environment, in accordance with an embodiment of the present invention.

Reference is now made to FIG. 3. FIG. 3 is a functional block diagram illustrating a data processing environment, generally designated 300, in accordance with an embodiment of the present invention. FIG. 3 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of a cloud of a cloud environment 300 includes, PaaS A 310, PaaS B 320, PaaS n 330 and Cloud of a Cloud 340 interconnected over network 305. PaaS A 310, PaaS B 320, PaaS n 330 and Cloud of a Cloud 340 may include internal and external hardware components, as depicted and described in further detail with respect to FIG. 7. Cloud environment 300 may include additional computing devices, servers or other devices not shown.

Network 305 can be, for example, a local area network (LAN), a telecommunications network, a wide area network (WAN) such as the Internet, or any combination of the three, and include wired, wireless, or fiber optic connections. In general, network 305 can be any combination of connections and protocols that will support communications between PaaS A 310, PaaS B 320, PaaS n 330 and Cloud of a Cloud 340 and any other computer connected to network 305, in accordance with embodiments of the present invention.

In the exemplary embodiment, PaaS A 310, PaaS B 320, through PaaS n 330 are cloud computing services. It is noted that PaaS A 310 and PaaS B 320 are exemplary embodiments only. In other embodiments, PaaS A 310, PaaS B 320 and PaaS n 330 may represent IaaS, SaaS and/or additional services known in the art. PaaS n 330, represents any number of PaaS systems that in communication with Cloud of a Cloud 340

As described above, a cloud computing platform, known generally as a PaaS, is a suite of technology which is a network infrastructure maintained by a service provider upon which developed web applications can be deployed. A PaaS framework is a cloud service capable of composing and orchestrating multiple cloud applications and services on the same cloud platform. Generally, the service provider manages and/or controls the underlying infrastructure which may include networks, servers, operating systems and/or storage, and the user (a developer) has control over the deployed applications. The PaaS framework provides building blocks for cloud applications which allow developers to focus on code creation, without having to worry about how an application may be scaled at runtime. Thereby the PaaS framework enables a user to focus on the development of the web applications itself, as the PaaS provides the hardware resources and software layers to run applications. Therefore the PaaS cloud based computing framework, is generally designed to manage the logistics and orchestration of the environment by supporting development, running and the management of applications.

Embodiments of the present invention recognize that PaaS is a category of cloud computing services which provide customers the ability to develop, run and manage applications without the need to build and maintain the infrastructure. Additionally, embodiments of the present invention acknowledge that PaaS cloud computing is generally structured to support large numbers of users, process very large quantities of data and is potentially accessible from any point in the internet. Further, PaaS facilitate the construction of high quality, scalable applications by providing generalized software building blocks, as well as, a development tools, such as programming languages and support runtime environments. Embodiments of the present invention augment and enhance the platform of the cloud service.

In the exemplary embodiment, cloud of a cloud 340 is a high level cloud used to bridge various different cloud systems together, providing a user and/or client the freedom to select the runtime and service independently. Cloud of a cloud 340 includes remote service program 342, information repository 344 and user interface 346.

In an exemplary embodiment, cloud of a cloud 340, offers a client (herein after referred to as 'application developer') the ability to build application, capable of working on any target platform. As used herein, the term 'target platform' refers to the specific platform, the application developer wishes to use, for example, PaaS A 310, PaaS B, 320 or PaaS n 330.

Remote service program 342, manages and controls cloud of a cloud 340 interworking with a target platform (i.e. PaaS A 310, PaaS B, 320 or PaaS n 330). In an embodiment, remote service program 342 creates and manages access points to a multitude of PaaS platforms. In an embodiment, remote service program 342 is able to retrieve service catalogs from the multitude of PaaS platforms. In one scenario, remote service program 342 may provide a unified view of service catalogs for the multitude of PaaS platforms.

In an embodiment, remote service program 342 manages two separate and distinct features. The first feature remote service program 342 manages, occurs during deployment time. Deployment time encompasses the setting up a bridge and gathering information on the target platform. In an exemplary embodiment, for each services available on different PaaS platforms, remote service program 342 may create, and then utilize a bridge instance to represent the service which allows an application developer to bind their application to the service. The bridge instance, for example, may be located on the target platform. In one scenario, the bridge instance, located on the target PaaS platform may propagate the service binding information to information repository 344.

The second feature remote service program 342 manages occurs during runtime. During the runtime the application is run on the target platform. In one embodiment, remote service program 342 causes the application developer's application to access the target service via an API gateway.

An API gateway functions as access control as it may filter traffic allowing only authenticated and/or authorized traffic to proceed. In an embodiment, an API gateway is used by a cloud application when the application attempts to access services that is hosted on a different PaaS platform. An API gateway preforms access control of the request to ensure the credentials provided by a user are valid. If, the credentials are valid, an API gateway may look up local registry to retrieve the right access credentials for accessing the service located in the target platform. Therefore, and application developer keeps only one access credentials (the credentials to the cloud system itself) and an API gateway replaces the credentials with each platform specific credentials during run time. Further detail describing remote service program 342 is discussed in FIGS. 4-6B.

Remote service program 342 may utilize additional features and components not depicted in FIG. 3. For example, in an embodiment, remote service program 342 may utilize a bridge for each service instance to be used on the specific platform. A bridge may serve as a mechanism between cloud of cloud 340 and a PaaS platform, providing a means of communication between the two entities. A bridge may be connected to a node, which functions as a data point on a larger network. In this scenario, remote service program 342 may create a node on the target service to and/or from information repository 344.

In another exemplary embodiment, remote service program 342 may utilize an API gateway to preform access control of cross platform service access. In one scenario, when remote service program 342 attempts to access services (i.e., API's) that are hosted on different PaaS platforms an API gateway may verify access by authorizing credentials of a user. Remote service program 342 may be stored in a persistent storage component (not depicted) for execution and/or access by one or more of processor(s) via one or more memories (for more detail refer to FIG. 7). Additional features and components of remote service program 342, not shown or discussed, may be appreciated by those skilled in the art.

Information repository 344 may be implemented using any suitable volatile or non-volatile computer readable storage media, and may include random access memory (RAM) and cache memory (not depicted in FIG. 3). For example, information repository 344 may be implemented with a tape library, optical library, one or more independent hard disk drives, or multiple hard disk drives in a redundant array of independent disks (RAID). Similarly, information repository 344 may be implemented with any suitable storage architecture known in the art, such as a relational database, an object-oriented database, or one or more tables. Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information.

Information repository 344 stores application developer programs and/or service access information to the various target platforms and target services available to cloud of cloud 340. For example, information repository 344 stores all information, for instance, received data, nodes, applications, login credentials, etc. from PaaS A 310, PaaS B, 320 or PaaS n 330. Information repository 344 may contain lookup tables, charts, graphs, functions, equations, programs, applications, and the like that remote service program 342 may access in order to and manage, maintain and manipulate parameters of cloud of cloud 340 and the various target platforms (i.e. PaaS A 310, PaaS B, 320 or PaaS n 330). Information stored on information repository 344 may include but not limited to various applications, authorization credentials, SDK, and access information.

In an embodiment, information repository 344 may provide a repository allowing application developers to upload their application code to. This allows remote service program 342 to deploy application to a target platform and bind the desired PaaS service in an automatic way.

User interface 346, of cloud of a cloud 340 is to be interpreted broadly. In an embodiment, user interface 346 allows a user of cloud of cloud 340 to interact with remote service program 342 and subsequently with any target platform (i.e. PaaS A 310, PaaS B, 320 or PaaS n 330).

User interface 346 provides an interface between a user and cloud environment 300. Generally a user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. Through user interface 346, cloud of a cloud 340 provides a unified view of service catalog for all PaaS platforms it connects to, for example, PaaS A 310, PaaS B, 320 or PaaS n 330.

Cloud of a cloud 340, using remote service program 342 and information repository 344, provides an application developer the ability to select which services, provided by various service provider platforms (i.e., PaaS A 310, PaaS B, 320 or PaaS n 330), to utilize in building their application.

Reference is now made to FIG. 4. FIG. 4 is a flowchart 400 illustrating operational steps for higher level cloud, in accordance with an embodiment of the present invention.

Flowchart 400 represents the operational steps for maintaining and executing an application though a higher level cloud, such as cloud of a cloud 340. In an embodiment, flowchart 400 represents the operation steps to preform application processing 96 in workloads layer 90. In one embodiment, the steps of flowchart 400 are performed by remote service program 342. For example, and application developer may invoke flowchart 400 upon determining to utilize a higher level cloud, such as cloud of a cloud 340. In an alternative embodiment, steps of flowchart 400 may be performed by any other program while working with remote service program 342. It is noted that flowchart 400 will be described in reference to FIGS. 5A-5C, which depicts an exemplary diagram of a higher level cloud, in accordance with an embodiment of the invention.

Flowchart 400 may be separated into two aspects of remote service program 342. Module 410 describes the operational steps of deployment. During deployment, remote service program 342 deploys a bridge instance on the target platform, to transmit service binding information back to an application repository (for example, information repository 344). Remote service program 342 during module 410 gains access to the target platform. In contrast, module 420 describes the operation steps during runtime. During runtime, an application accesses a service deployed on a different PaaS platform. Therefore, through module 410 and module 420, remote service program 342 may bridge different PaaS services via cloud of a cloud 340.

In step 412, remote service program 342, deploys a cloud of a cloud bridge instance on the target service platform. A service bridge is an established forwarding mechanism allowing cloud of a cloud 340 to communicate with a PaaS platform (i.e., PaaS A 310, PaaS B, 320 or PaaS n 330). Generally a service bridge links two destinations, a source destination where the bridge reads information from, and a target destination where the bridge sends the information from the source. During step 412, remote service program 342 may either utilize an existing service bridge or may create a new service bridge on the target service platform. For example, remote service program 342 may determine as to whether a service bridge already exists in the target service platform. If the service bridge does not exist, then remote service program 342, will create a service bridge on the target platform. This is repeated for each service on the target platform. Additionally, once a service bridge is created (or it is determined a service bridge exists) a new bridge instance is created. The bridge instance is tailored and designed for the specific application.

In an embodiment, step 412 is initiated when remote service program 342 receives a request from a user (i.e., application developer or another program). In an alternative embodiment, step 412 may initiate when an application developer and/or user selects a specific target runtime platform and the service to bind an application to. In this scenario, the application developer and/or user may select the service to bind from in a unified service catalogue (as shown and described with reference to FIGS. 5A-C).

In step 414, remote service program 342, retrieves service access information from the target service platform. Service access information may include access credentials to the target platform. For example, the bridge may propagate service binding information back to an application repository on the cloud of a cloud 340. In an embodiment, the service bridge (as identified in step 412) passes the service access information to an application repository as shown and described with reference to FIG. 5). Remote service program 342, acquisition of the target platforms credentials allows an API gateway to utilize the service access information at runtime, improving the remote service on the target platform during runtime. In other words, remote service program 342 retains the service access information for later use.

In step 416, remote service program 342, deploys application 502 on target platform with a custom software development kit (hereinafter referred to as 'SDK'). Generally, an SDK is a set of software tools which allow a creation of applications for a certain software package, software framework, hardware platform, operating system, computer system, and the like. In an embodiment, an SDK must be utilized for each specific system, in order to create an application. For example, an SDK may include one or more application programming interfaces (API) to interface with a particular program. In an embodiment, SDK provides the programming interface to developer (a user) to access a service in the target platform. For example, the SDK will route the request to an API gateway first for access control and credential substitution.

In an embodiment, remote service program 342 may generate a custom SDK to provide a platform agnostic way to access service content. Service content may include service connection URL, access credentials, etc. For example, the custom generated SDK may provide access to the target service via an API gateway. Stated another way, remote service program 342 may generate a custom SDK to provide a programming interface for a developer to access at least one service in a target platform. For instance, the SDK will route the request to API gateway first for access control.

During module 420, an application accesses a service deployed on a separate PaaS platform. Step 422 commences when the application attempts to access the remote service deployed on a separate PaaS platform. Thus in step 422, remote service program 342 uses a custom SDK to access the service, and then forwards the request to an API gateway. In an alternative embodiment, in step 422 remote service program 342 calls a custom SDK which invokes the API gateway with the cloud of a cloud 340 credentials. In an exemplary embodiment, an SDK accesses the target service via the API gateway. For example, the API gateway looks up the access information of the target platform then performs the access control.

In step 424 the API gateway is validated. If the API gateway does not authenticate and thereby refuse access, the application cannot be run on the designated platform. Therefore, if the API gateway is not validated, remote service program 342, alerts the user. In an alternative embodiment, if the API gateway is not validated then remote service program 342, rejects the service access.

Alternatively, in step 424, the API gateway is authenticated and validated, allowing access to the designated platform.

In step 426, remote service program 342, initiates API gateway to retrieve the access credentials from the application repository and forwards them to the target service platform. In an exemplary embodiment, once validated, remote service program 342, may then forward the request to the associated bridge instance (established in step 412) along with the access credentials of the target platform. The access credentials may be stored in an application repository. Alternatively, the credentials may be stored in database, similar to that of information repository 344.

Step 426 concludes when remote service program 342, utilizing the access credentials, though the bridge instance, invokes the target service.

Therefore, combining the exemplary steps of flowchart 400, remote service program 342 through the components of a cloud of a cloud (shown and not shown in FIG. 3 and FIG. 5), provides an application developer the ability to choose specific runtime and services independently. For example, an application developer may upload his application to an application repository on the cloud of a cloud. The application developer may then select any defined service, wherein remote service program 342 binds metadata of the service to the application. Additionally, the application developer may select a different target platform to deploy than the service. For instance, the application (along with the bound metadata of the service application) is deployed on the target runtime; while remote service program 342 deploys a bridge on the target service platform. The bridge node provides service metadata which is passed to the SDK of the application. When the application is deployed, the application uses the SDK to get the service runtime metadata, which contains the access information and credentials, to be used in order to access the target platform. Once the application is verified, the application can then consume the target service as normal.

Reference is now made to FIGS. 5A-C and FIGS. 6A-B.

Figure 5A:
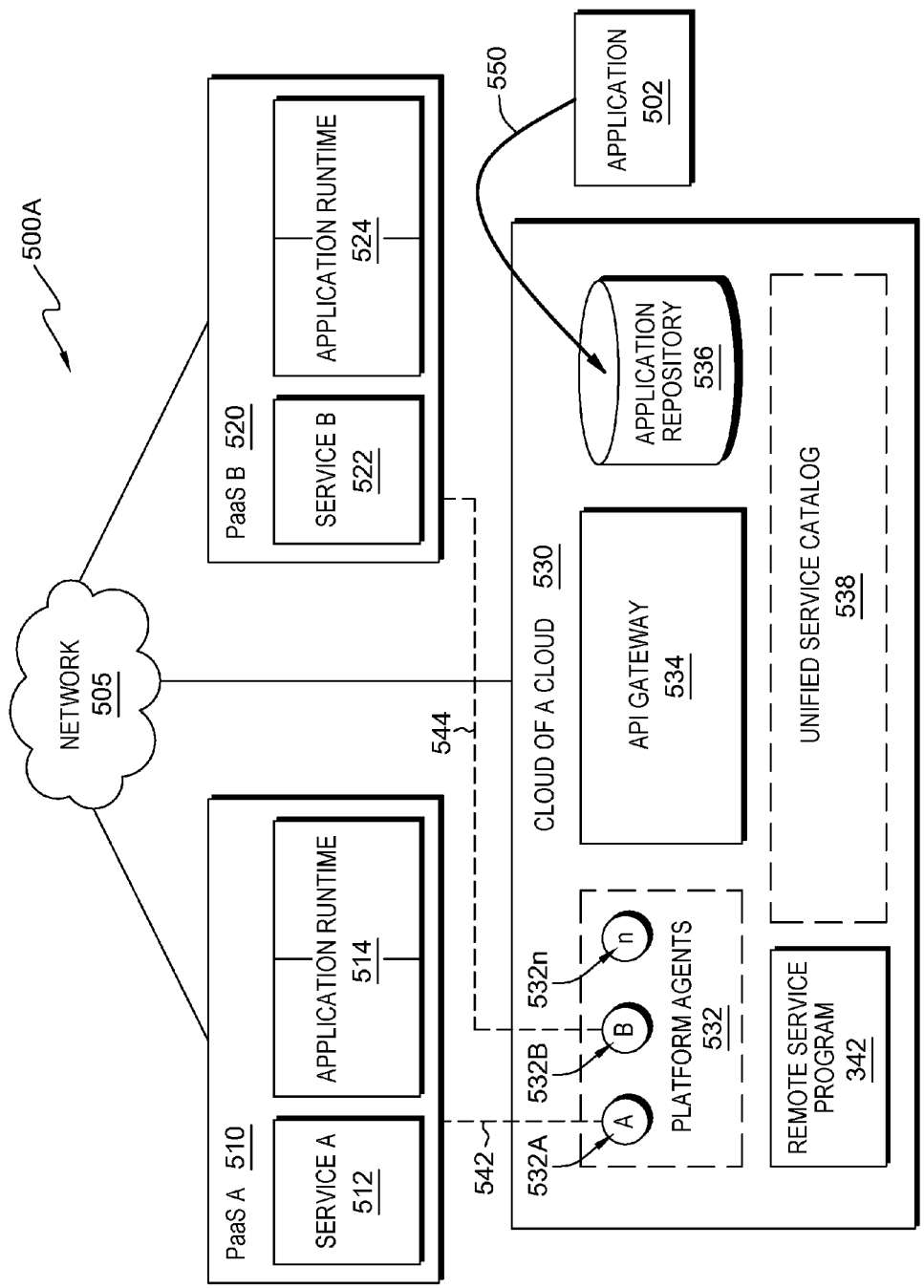
Figure 5B:
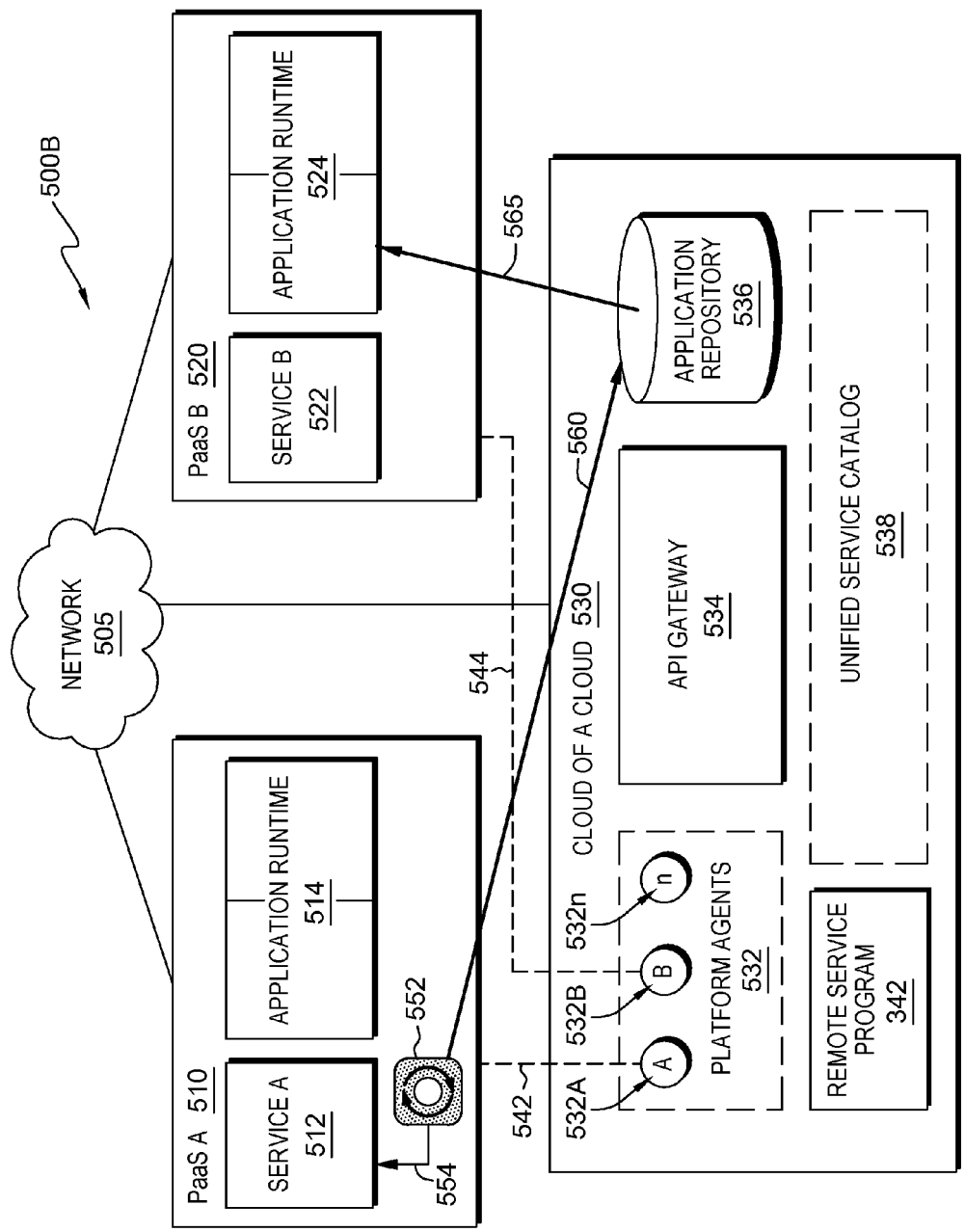

FIGS. 5A-C are an illustrative example of a invoking a service on a target platform, in accordance with an embodiment of the present invention. Specifically, FIG. 5A is an illustrative example of preliminary embodiment 500A, in accordance with an embodiment of the present invention. Similarly, FIG. 5B portrays embodiment 500B which is an illustrative example of module deployment 410. FIG. 5C portrays embodiment 500C which is an illustrative example of module 420.

Figure 6A:
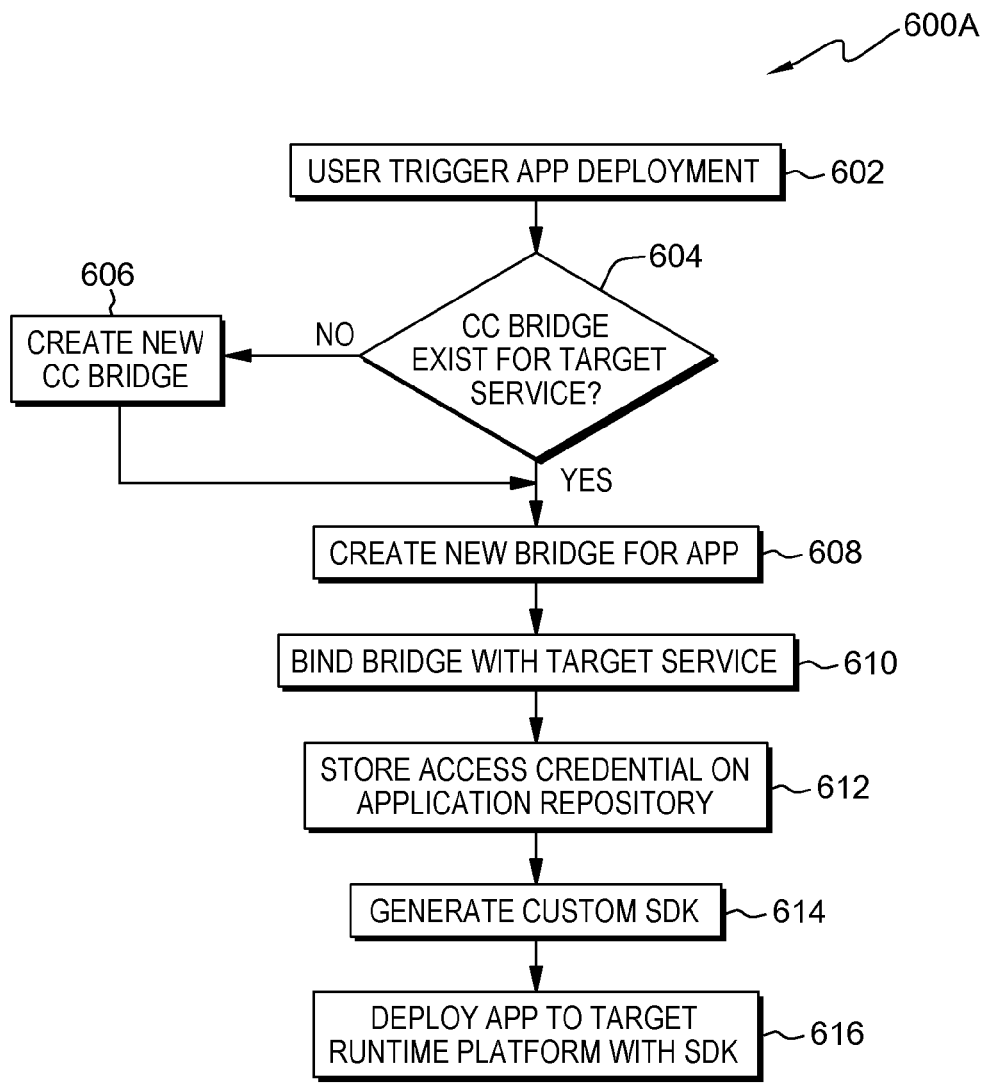
FIG. 6A is an example flowchart illustrating an exemplary implementation at deploy time, in accordance with an embodiment of the present invention.
Figure 6B:
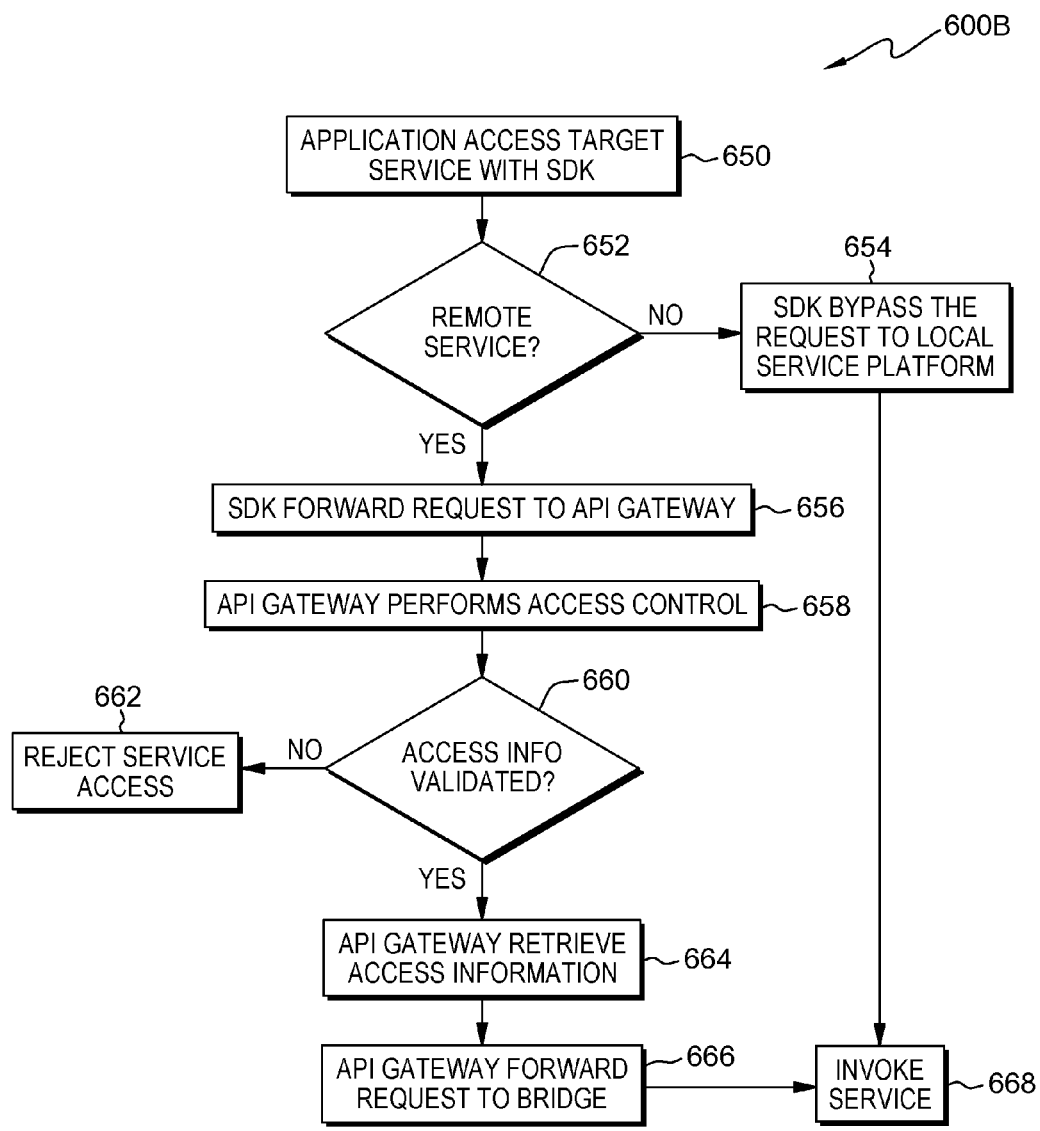
FIG. 6B is an example flowchart illustrating an exemplary implementation at runtime, in accordance with an embodiment of the present invention.

FIGS. 6A and 6B are exemplary flowcharts illustrating an implementation at deploy time and runtime, with respect to FIGS. 5A-C, in accordance with an embodiment of the present invention.

Exemplary embodiments 500A, 500B and 500C, include PaaS A 510, PaaS B and Cloud of a Cloud 530 interconnected via network 505. It is noted that embodiments 500A, 500B and 500C represent similar components to that of cloud embodiment 300 of FIG. 3.

PaaS A 510 and PaaS B 520 are cloud platforms, operated by different entities. In other embodiments, PaaS A 510, and PaaS B 520 may represent IaaS, SaaS and/or additional services known in the art. Referring to FIGS. 5A, 5B and 5C, PaaS A 510 represents the platform to host the service to be invoked, also specified as, the target platform.

PaaS A 510 contains Service A 512, Application runtime 514, as well as other components not shown in FIGS. 5A-5C. Similarly, PaaS B 520 contains Service B 522, Application runtime 524, as well as other components not shown in FIGS. 5A-5C. Service A 512 and Service B 522 represent a service provided on PaaS A 510 and PaaS B 520, respectively, for an application developer to select and utilize. There may be more than one service on PaaS A 510 and PaaS B 520, however, for illustrative purposes only a single service is depicted. For example, Service A 512 and Service B 522 represent any resource that is provided over the network 505 through PaaS A 510 and PaaS B 520, respectively. For instance Service A 512 and Service B 522 over PaaS A 510 and PaaS B 520, respectively, may refers to the delivery of operating systems and associated services over network 505 without downloads or installation. Application runtime 514 on PaaS A 510 and Application runtime 524 on PaaS B 520 represent an environment which may allow application developers to execute programs that are made for a specific application. For example, runtime environment may exist without other features that allow for more permanent use, such as building executable files.

Referring to FIGS. 5A-C, cloud of a cloud 530 is the higher level cloud, discussed previously. Cloud of a Cloud 530 offers an application developer the ability to build a generic application working on a target platform. The app may be generic as it is not tailored to a distinct platform as most PaaS platforms utilize propriety languages. Cloud of a cloud 530 has access to PaaS A 510 and PaaS B 520 via network 505. Cloud of a cloud 530 includes: remote service program 342; platform agents 532A, 532B, 532n, API gateway 534; application repository 536 and unified service catalog. Platform agent 532n represents any number platform agents, within cloud of a cloud 530. It is noted that platform agents 532 and unified service catalog 538 are depicted with dashed lines, in order to indicate that they are expandable.

Platform agents 532A-n individually depict a communication pathway between cloud of a cloud 530 and a respective PaaS platform. Specifically, each platform, PaaS A 510 and PaaS B 520 has their own platform agents 532A and platform agents 532B, respectively. Platform agents 532A-n may provide the communication medium for cloud of cloud 530 to retrieve service metadata on their respective PaaS platform. Additionally platform agents 532A-n assist in creating a bridge on their respective platform when the application developer tries to use the platforms service.

API gateway 534 performs the access control of cross platform service access. Generally, API gateway 534 procures the access information to the target platform from the application repository 536.

Application repository 536 servers as memory supporting remote service program 342. For example, application repository 536 stores an application from an application developer. Additionally, application repository 536 may also store credentials to access the target platform.

Unified service catalog 538 maintains service data retrieved from and associated with each individual PaaS service catalog. Service data may be metadata or other forms of data known in the art. Service data within unified service catalog 538 represents services an application developer can select from the various platforms, situated in one location. Additionally, unified service catalog 538 may serve as a user interface allowing an application developer to select a specific service to use. For example, unified service catalog 538 provides a unified view of all service catalog representing the PaaS platforms of a cloud 530 has access to and able to retrieve their respective service catalogs.

Reference is now made to FIG. 5A. FIG. 5A depicts a preliminary step, prior to that of deployment module 410 of FIG. 4. FIG. 5A portrays the introductory step where cloud of a cloud 530 receives an application 502. Cloud of a cloud 530 receives application 502 from an application developer, and stores application 502 in application repository 536. In an embodiment remote service program 342 prompts the application developer to select a specific service as well as a target runtime platform. In an alternative embodiment, remote service program 342 prompts the application developer to select a target runtime and the services to bind, from unified service catalog 538.

Reference is now made to FIG. 5B and FIG. 6A. Application developer triggers step 602, when the application developer selects a target runtime and the services to bind from unified service catalog 538, thereby commencing deployment of application 502 to cloud of a cloud 530. When the request is submitted, or at time of deployment, the application code along with cloud of a cloud 530 service binding metadata is deployed on the target runtime. For example, de along with cloud of a cloud 530 service binding metadata is deployed on application runtime 524. At or around the same time, cloud of cloud 530 will deploy bridge instance 552 on PaaS A 510 (the target platform). This will allow the bridge instance 552 to receive service runtime metadata, which may then be passed to the SDK of the application. In step 604, remote service program 342 determines, for services to be used by application 502, if a service bridge exists in the target platform. If no service bridge exists on the platform, PaaS A 510, remote service program 342, will create one, per step 606. For each service in PaaS A 510, there will be a service bridge. In step 608, once a service bridge is identified (or created, per step 606), remote service program 342 will create a new bridge instance 552 for application 502. For example, remote service program 342, deploys a bridge node on the target service platform, PaaS A 510. In step 610, bridge instance 552 binds services in the target platform, PaaS A 510. Binding services may act like a traditional application/service binding.

Step 612 coupled with line 560 describes the bridge propagating service binding information to application repository 536. In this scenario, service binding information includes service access credentials to PaaS A 510. Remote service program 342 retrieves access information from PaaS A 510 and stores it in application repository 536. It is noted that step 610 allows API gateway 534 to retrieve access credentials during runtime.

In step 614, the access information may be used to create a custom SDK (used forthcoming, to access the target service via API gateway 534), and attached to application 502. As previously described, the custom SDK is created to make it convenient for an application developer to access services. The custom SDK provides the programming interface to a developer to access service in target platform, PaaS A 510.

Simultaneously, and/or near simultaneously thereafter, step 616 and line 565 portrays remote service program 342 deploying the application 502 as well the custom SDK, to target runtime platform, PaaS B 520. The custom SDK may include service binding metadata. Additionally, and/or alternatively, the custom SDK may contain access credentials.

Reference is now made to FIG. 5C and FIG. 6B. FIG. 5C depicts runtime. Runtime describes Application 502 attempting to access remote service A 512 on PaaS A 510. Generally, when the application is deployed, the application utilizing the SDK to receive service runtime metadata, providing access information and credentials to be used. Thereby providing the ability for the application to consume the target service as normal. An example of the runtime scenario is made with reference to step 650. In step 650, application 502 tries to access the service. Decision 652 determines if the service to invoke is a remote service, i.e., the service is located on a different PaaS platform. If the service is local (as depicted in step 654), then the SDK passes the request to the local platform directly, and invokes to service per step 668. If however, the service is remote, then in step 656 the SDK forwards the request to access the remote service to API gateway 534. Line 570 portrays the custom SDK sent to API gateway 534. The custom SDK includes the request to access remote service A512 on PaaS A 510 and access credentials to cloud of a cloud 530. In an embodiment, if the service is not remote, (i.e., the service is located on a local platform), then the request may be forwarded to the local platform directly.

In step 658, API gateway 534 preforms the access control, by authenticating and authorizing the SDK request. Decision 660 determines whether the access is validated by API gateway 534. If the access is not validated, then the request is rejected, per step 662. If, however, the request is validated, then in step 664 (as portrayed by line 572), API gateway 534 retrieves the specific access credentials to the target platform from application repository 536 (saved in step 612). For example, remote service program 342 directs API gateway 534, as show in 572, in response to receiving and validating the custom SDK, API gateway 534 retrieves the access information from application repository 536.

In step 666 (as portrayed in line 575), API gateway 534 forwarding the request and service access credentials (contained within the custom SDK) to the associated bridge instance 552 to invoke the target service. The access credentials were previously retrieved from application repository 536 per step 664. The example concludes as the target service is invoked, in step 668.

Figure 7:
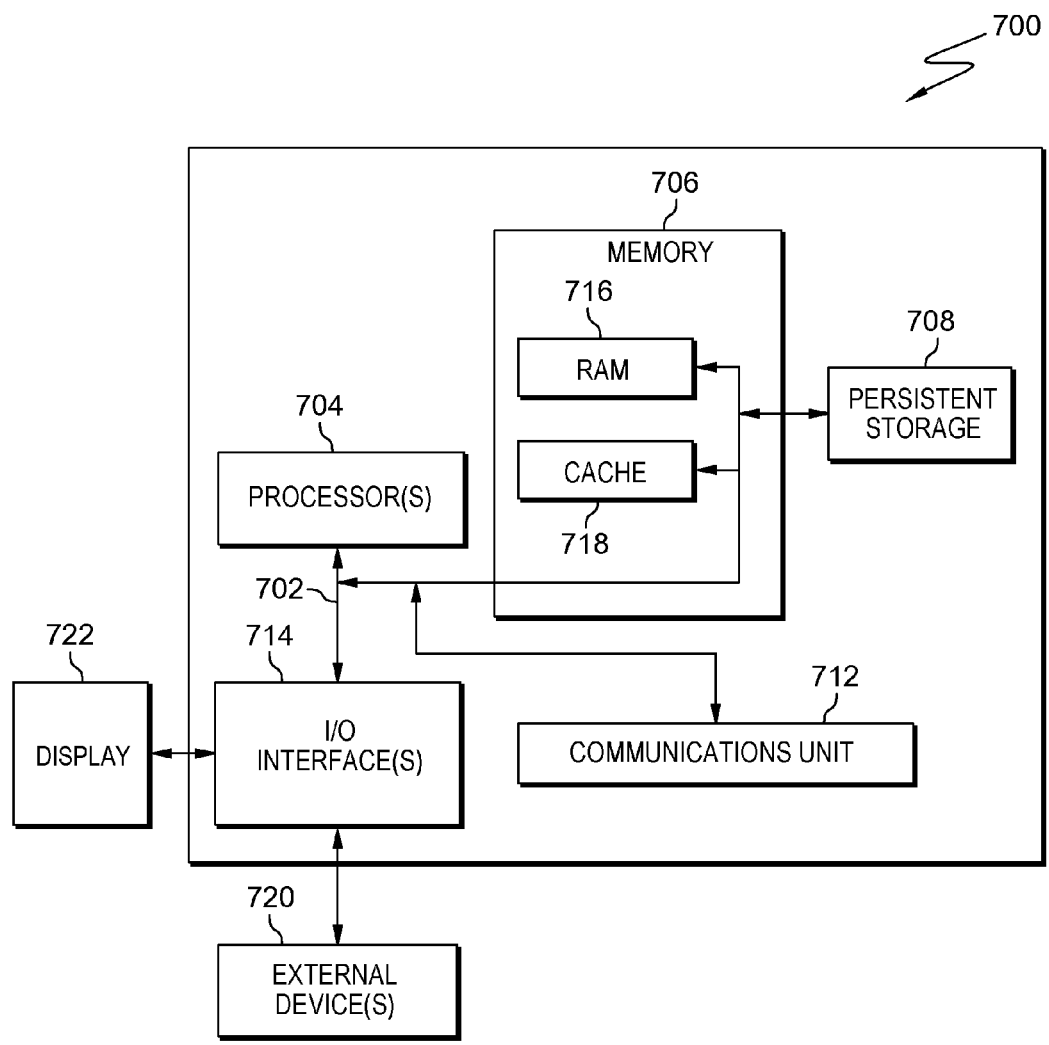
FIG. 7 depicts a diagram of internal and external components of an electronic device, in accordance with an embodiment of the present invention.

FIG. 7 is a block diagram of internal and external components of a computer system, which is representative of various aspects included in, cloud embodiment 300 of FIG. 3, in accordance with an embodiment of the present invention. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, wearable computing devices, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 includes communications fabric 702, which provides for communications between one or more processors 704, memory 706, persistent storage 708, communications unit 712, and one or more input/output (I/O) interfaces 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 716 and cache memory 718. In general, memory 706 can include any suitable volatile or non-volatile computer readable storage media. Software is stored in persistent storage 708 for execution and/or access by one or more of the respective processors 704 via one or more memories of memory 706.

Persistent storage 708 may include, for example, a plurality of magnetic hard disk drives. Alternatively, or in addition to magnetic hard disk drives, persistent storage 708 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 708 can also be removable. For example, a removable hard drive can be used for persistent storage 708. Other examples include optical and magnetic disks, thumb drives, and smart cards that are inserted into a drive for transfer onto another computer readable storage medium that is also part of persistent storage 708.

Communications unit 712 provides for communications with other computer systems or devices via a network (e.g., network). In this exemplary embodiment, communications unit 712 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to through communications unit 712 (e.g., via the Internet, a local area network or other wide area network). From communications unit 712, the software and data can be loaded onto persistent storage 708.

One or more I/O interfaces 714 allow for input and output of data with other devices that may be connected to computer system 700. For example, I/O interface 714 can provide a connection to one or more external devices 720 such as a keyboard, computer mouse, touch screen, virtual keyboard, touch pad, pointing device, or other human interface devices. External devices 720 can also include portable computer readable storage media such as, for example, thumb drives, portable optical or magnetic disks, and memory cards. I/O interface 714 also connects to display 722.

Display 722 provides a mechanism to display data to a user and can be, for example, a computer monitor. Display 722 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more processors, at least one application from a user, wherein the at least one application is stored on a communication platform;
   receiving, by one or more processors, a catalog, wherein the catalog includes at least one service and wherein each service of the at least one service is associated with a platform of a plurality of platforms;
   receiving, by one or more processors, an indication of a selection from the user, wherein the selection comprises a first service of the at least one service associated with a first platform, and a second service of the at least one service associated with a second platform, wherein the first service of the first platform stores the at least one application from the user, and wherein the second service of the second platform runs the at least one application from the user;
   responsive to receiving the indication, deploying, by one or more processors, the at least one application, from the communication platform to the indicated first platform for storage;
   responsive to receiving the indication, deploying, by one or more processors, a service bridge from the communication platform to the second platform, wherein the service bridge enables the at least one application from the user to access the second platform; and
   running, by one or more processors, the at least one application on the second platform from the first platform utilizing the service bridge.

2. The method of claim 1, wherein deploying the at least one application to the indicated first platform for storage, further comprises:
   receiving, from the service bridge, a security authentication certification associated with the second platform from the service bridge;
   creating, by one or more processors, a custom software development kit (SDK), wherein the custom SDK includes the security authentication certification associated with the second platform; and
   binding, by one or more processors, the custom SDK with the at least one application of the user.

3. The method of claim 2, wherein running the at least one application on the first platform through the second service of the second platform utilizing the service bridge comprises:
   utilizing, by one or more processors, the custom SDK, for accessing the second service on the second platform, upon deploying the service bridge from the communication platform to the second platform.

4. The method of claim 1, wherein receiving the catalog further comprises:
   establishing, by one or more processors, at least one platform agents, wherein each platform agent of the at least one platform agents is associated with a platform of the plurality of platforms, and wherein the communication platform communicates with each platform agent of the at least one platform agents associated with the platform of the plurality of platforms;
   retrieving, by each of the at least one platform agent, service data associated with each platform of the plurality of platforms, wherein the service data, includes a security authentication certification to access the second platform; and
   creating, by one or more processors, the catalog based at least in part on the service data retrieved by at least one platform agent associated with each platform of the plurality of platforms.

5. The method of claim 1, wherein deploying the service bridge further comprises:
   establishing, by one or more processors, a node on the second platform, wherein the node allows data to exchange between the communication platform and the second platform.

6. The method of claim 1 wherein the first platform and the second platform are in communication through the communication platform.

7. The method of claim 1 wherein the first platform, the second platform and the communication platform are platform as a service (PaaS).

8. A computer program product comprising a computer readable storage medium and program instructions stored on the computer readable storage medium, the program instructions comprising:
   program instructions to receive at least one application from a user, wherein the at least one application is stored on a communication platform;
   program instructions to receive a catalog, wherein the catalog includes at least one service and wherein each service of the at least one service is associated with a platform of a plurality of platforms;
   program instructions to receive an indication of a selection from the user, wherein the selection comprises a first service of the at least one service associated with a first platform, and a second service of the at least one service associated with a second platform, wherein the first service of the first platform stores the at least one application from the user, and wherein the second service of the second platform runs the at least one application from the user;
   responsive to receiving the indication, program instructions to deploy the at least one application, from the communication platform to the indicated first platform for storage;
   responsive to receiving the indication, program instructions to deploy a service bridge from the communication platform to the second platform, wherein the service bridge enables the at least one application from the user to access the second platform; and
   program instructions to run the at least one application on the second platform from the first platform utilizing the service bridge.

9. The computer program product of claim 8, wherein deploying the at least one application to the indicated first platform for storage, further comprises:
   program instructions to receive, from the service bridge, a security authentication certification associated with the second platform from the service bridge;
   program instructions to create a custom software development kit (SDK), wherein the custom SDK includes the security authentication certification associated with the second platform; and
   program instructions to bind the custom SDK with the at least one application of the user.

10. The computer program product of claim 9, wherein running the at least one application on the first platform through the second service of the second platform utilizing the service bridge comprises:
 program instructions to utilize the custom SDK, for accessing the second service on the second platform, upon deploying the service bridge from the communication platform to the second platform.

11. The computer program product of claim 8, wherein receiving the catalog further comprises:
 program instructions to establish at least one platform agents, wherein each platform agent of the at least one platform agents is associated with a platform of the plurality of platforms, and wherein the communication platform communicates with each platform agent of the at least one platform agents associated with the platform of the plurality of platforms;
 program instructions to retrieve, by each of the at least one platform agent, service data associated with each platform of the plurality of platforms, wherein the service data, includes a security authentication certification to access the second platform; and
 program instructions to create the catalog based at least in part on the service data retrieved by at least one platform agent associated with each platform of the plurality of platforms.

12. The computer program product of claim 8, wherein deploying the service bridge further comprises:
 program instructions to establish a node on the second platform, wherein the node allows data to exchange between the communication platform and the second platform.

13. The computer program product of claim 8, wherein the first platform and the second platform are in communication through the communication platform.

14. The computer program product of claim 8, wherein the first platform, the second platform and the communication platform are platform as a service (PaaS).

15. A computer system comprising:
 one or more computer processors;
 one or more computer readable storage media;
 program instructions stored on the one or more computer readable storage media for execution by at least one of the one or more processors, the program instructions comprising:
 program instructions to receive at least one application from a user, wherein the at least one application is stored on a communication platform;
 program instructions to receive a catalog, wherein the catalog includes at least one service and wherein each service of the at least one service is associated with a platform of a plurality of platforms;
 program instructions to receive an indication of a selection from the user, wherein the selection comprises a first service of the at least one service associated with a first platform, and a second service of the at least one service associated with a second platform, wherein the first service of the first platform stores the at least one application from the user, and wherein the second service of the second platform runs the at least one application from the user;
 responsive to receiving the indication, program instructions to deploy the at least one application, from the communication platform to the indicated first platform for storage;
 responsive to receiving the indication, program instructions to deploy a service bridge from the communication platform to the second platform, wherein the service bridge enables the at least one application from the user to access the second platform; and
 program instructions to run the at least one application on the second platform from the first platform utilizing the service bridge.

16. The computer system of claim 15, wherein deploying the at least one application to the indicated first platform for storage, further comprises:
 program instructions to receive, from the service bridge, a security authentication certification associated with the second platform from the service bridge;
 program instructions to create a custom software development kit (SDK), wherein the custom SDK includes the security authentication certification associated with the second platform; and
 program instructions to bind the custom SDK with the at least one application of the user.

17. The computer system of claim 16, wherein running the at least one application on the first platform through the second service of the second platform utilizing the service bridge comprises:
 program instructions to utilize the custom SDK, for accessing the second service on the second platform, upon deploying the service bridge from the communication platform to the second platform.

18. The computer system of claim 15, wherein receiving the catalog further comprises:
 program instructions to establish at least one platform agents, wherein each platform agent of the at least one platform agents is associated with a platform of the plurality of platforms, and wherein the communication platform communicates with each platform agent of the at least one platform agents associated with the platform of the plurality of platforms;
 program instructions to retrieve, by each of the at least one platform agent, service data associated with each platform of the plurality of platforms, wherein the service data, includes a security authentication certification to access the second platform; and
 program instructions to create the catalog based at least in part on the service data retrieved by at least one platform agent associated with each platform of the plurality of platforms.

19. The computer system of claim 15, wherein deploying the service bridge further comprises:
 program instructions to establish a node on the second platform, wherein the node allows data to exchange between the communication platform and the second platform.

20. The computer system of claim 15, wherein the first platform, the second platform and the communication platform are platform as a service (PaaS).

* * * * *